(12) United States Patent
Xiao

(10) Patent No.: US 11,610,178 B2
(45) Date of Patent: Mar. 21, 2023

(54) INFORMATION OUTPUT METHOD AND APPARATUS

(71) Applicant: Beijing Jingdong Qianshi Technology Co., Ltd., Beijing (CN)

(72) Inventor: Pengyu Xiao, Beijing (CN)

(73) Assignee: Beijing Jingdong Qianshi Technology Co., Ltd., Beijing (CN)

(*) Notice: Subject to any disclaimer, the term of this patent is extended or adjusted under 35 U.S.C. 154(b) by 390 days.

(21) Appl. No.: 16/770,907

(22) PCT Filed: Oct. 10, 2018

(86) PCT No.: PCT/CN2018/109680
§ 371 (c)(1),
(2) Date: Jun. 8, 2020

(87) PCT Pub. No.: WO2019/114391
PCT Pub. Date: Jun. 20, 2019

(65) Prior Publication Data
US 2021/0201251 A1 Jul. 1, 2021

(30) Foreign Application Priority Data
Dec. 11, 2017 (CN) .......................... 201711309753.0

(51) Int. Cl.
*G06Q 10/087* (2023.01)
*G06F 7/24* (2006.01)
(Continued)

(52) U.S. Cl.
CPC ............. *G06Q 10/087* (2013.01); *G06F 7/24* (2013.01); *G06F 7/32* (2013.01); *G06F 7/36* (2013.01)

(58) Field of Classification Search
CPC ...... G06Q 10/087; G06Q 10/08; G06Q 30/06; G06F 7/24; G06F 7/32; G06F 7/36
(Continued)

(56) References Cited

U.S. PATENT DOCUMENTS

| | | | |
|---|---|---|---|
| 11,137,980 B1* | 10/2021 | Animesh | G06F 16/587 |
| 2003/0158796 A1* | 8/2003 | Balent | G06Q 30/06 |
| | | | 705/28 |
| 2017/0225892 A1* | 8/2017 | Li | G06Q 10/087 |

FOREIGN PATENT DOCUMENTS

| CN | 203588314 U | 5/2014 |
|---|---|---|
| CN | 105427065 A | 3/2016 |

(Continued)

OTHER PUBLICATIONS

International Search Report and Written Opinion for PCT/CN2018/109680, dated Jan. 2, 2019, 3 pages.

*Primary Examiner* — Garcia Ade
(74) *Attorney, Agent, or Firm* — Blank Rome LLP

(57) ABSTRACT

Disclosed are an information output method and apparatus. One specific implementation of the method comprises: acquiring order data to be sorted; determining whether items to be sorted matching the order data to be sorted are stored in a shelf set; in response to having determined that items to be sorted matching the order data to be sorted are stored in the shelf set, determining, from the shelf set, a shelf storing an item to be sorted, and adding same to a candidate shelf set; choosing a candidate shelf from the candidate shelf set and adding same to a target shelf set, where the target shelf set stores the items to be sorted matching the order data; and outputting an identifier of a target shelf in the target shelf set.

16 Claims, 4 Drawing Sheets

(51) Int. Cl.
*G06F 7/32* (2006.01)
*G06F 7/36* (2006.01)
*G06Q 30/06* (2023.01)

(58) Field of Classification Search
USPC .......................................................... 705/28
See application file for complete search history.

(56) References Cited

FOREIGN PATENT DOCUMENTS

| | | |
|---|---|---|
| CN | 106311615 A | 1/2017 |
| CN | 106809586 A1 | 6/2017 |
| CN | 106875148 A | 6/2017 |
| CN | 106960304 A1 | 7/2017 |
| CN | 106991546 A | 7/2017 |
| CN | 107215606 A | 9/2017 |
| EP | 3171307 A1 | 5/2017 |
| WO | WO-2004004930 A1 * 1/2004 ............. G06Q 10/08 |

* cited by examiner

INFORMATION OUTPUT METHOD AND APPARATUS

CROSS-REFERENCE TO RELATED APPLICATIONS

The present disclosure is a national stage of International Application No. PCT/CN2018/109680, filed on Oct. 10, 2018, which claims the priority of Chinese Patent Application No. 201711309753.0, filed on Dec. 11, 2017, the contents of which are incorporated herein by reference in their entirety.

TECHNICAL FIELD

Embodiments of the present disclosure relate to the field of computer technologies, specifically to the field of Internet technologies, and more specifically to a method and apparatus for outputting information.

BACKGROUND

With the popularity of the Internet, the advantages of online shopping become more prominent, and the number of users using the Internet for shopping has been constantly rising. When a user makes a purchase on the Internet, the order data containing information about the item purchased is generated. A sorting worker sorts out a corresponding item according to the order data, and then packs the sorted item and sends it to the user by courier.

The current method for sorting out an item is usually that the sorting worker first manually judges the shelf where the item matching the order data is stored, and then walks to the shelf where the item matching the order data is stored in the shelf area and sorts from the shelf the item matching the order data to complete order sorting.

SUMMARY

Embodiments of the present disclose provides a method and apparatus for outputting information.

According to a first aspect, some embodiments of the present disclose provides a method for outputting information, the method including: acquiring to-be-sorted order data, the to-be-sorted order data comprising identifiers of to-be-sorted items and numbers of the to-be-sorted items; determining whether a shelf set stores to-be-sorted items matching the to-be-sorted order data; in response to determining that the shelf set stores the to-be-sorted items matching the to-be-sorted order data, determining, from the shelf set, a shelf storing a to-be-sorted item, and adding the shelf to a candidate shelf set; choosing a candidate shelf from the candidate shelf set and adding the candidate shelf to a target shelf set, the target shelf set storing the to-be-sorted items matching the to-be-sorted order data; and outputting identifiers of target shelves in the target shelf set.

In some embodiments, the choosing a candidate shelf from the candidate shelf set and adding the candidate shelf to a target shelf set, includes: determining, based on the identifiers of the to-be-sorted items and the numbers of the to-be-sorted items included in the to-be-sorted order data, to-be-sorted items and numbers of the to-be-sorted items stored in each candidate shelf in the candidate shelf set, a warehouse-out cost of each candidate shelf in the candidate shelf set; and choosing, based on the warehouse-out cost of each candidate shelf in the candidate shelf set and a partition to which the each candidate shelf belongs, the candidate shelf and adding the candidate shelf to the target shelf set.

In some embodiments, the choosing, based on the warehouse-out cost of each candidate shelf in the candidate shelf set and apartition to which the each candidate shelf, the candidate shelf and adding the candidate shelf to the target shelf set, includes: choosing a candidate shelf having a lowest warehouse-out cost and adding the candidate shelf to the target shelf set; performing following determination step: determining whether the target shelf set stores the to-be-sorted items matching the to-be-sorted order data, and in response to determining that the target shelf set stores the to-be-sorted items matching the to-be-sorted order data, then the adding to the target shelf set is completed.

In some embodiments, the choosing, based on the warehouse-out cost of each candidate shelf in the candidate shelf set and a partition to which the each candidate shelf, the candidate shelf and adding the candidate shelf to the target shelf set, further includes: in response to determining that the target shelf set does not store the to-be-sorted items matching the to-be-sorted order data: updating, based on a to-be-sorted item and a number of the to-be-sorted item stored in the target shelf set, the identifiers of the to-be-sorted items and the numbers of the to-be-sorted items included in the to-be-sorted order data; determining, based on the updated identifiers of the to-be-sorted items and the numbers of the to-be-sorted items included in the to-be-sorted order data, the to-be-sorted items and the number of the to-be-sorted items stored in each candidate shelf in the candidate shelf set, the warehouse-out cost of each candidate shelf in the candidate shelf set; choosing, based on the warehouse-out cost of each candidate shelf in the candidate shelf set and the partition to which the each candidate shelf belongs, the candidate shelf and adding the candidate shelf to the target shelf set, and continuing to perform the determination step.

In some embodiments, the outputting identifiers of target shelves in the target shelf set, includes: sending the identifiers of the target shelves in the target shelf set to at least one automated guided vehicle, so that the at least one automated guided vehicle moves the target shelves in the target shelf set to a manual sorting area, for a worker in the manual sorting area to sort out the to-be-sorted items matching the to-be-sorted order data from the target shelves in the target shelf set.

In some embodiments, before the acquiring to-be-sorted order data, the method further includes: acquiring an order data set within a preset time period, wherein a piece of order data comprises order time, an order category, identifiers of items, and numbers of the items; choosing at least one piece of order data from the order data set based on the order time, the order category, and the identifiers of items included in the order data in the order data set; and combining identifiers of the items and numbers of the items included in the pieces of order data in the at least one piece of order data, to generate the to-be-sorted order data.

In some embodiments, the method further includes: in response to determining that the shelf set does not store the be-sorted items matching the to-be-sorted order data, outputting replenishment prompt information, wherein the replenishment prompt information comprises the identifier of the to-be-sorted item with insufficient storage in the shelf set.

According to a second aspect, some embodiments of the present disclose provides an apparatus for outputting information, the apparatus includes: a first acquisition unit, configured to acquire to-be-sorted order data, the to-besorted order data comprising identifiers of to-be-sorted items and numbers of the to-be-sorted items; a first determination unit, configured to determine whether a shelf set stores to-be-sorted items matching the to-be-sorted order data; a second determination unit, configured to determine, in response to determining that the shelf set stores the to-be-sorted items matching the to-be-sorted order data, from the shelf set, a shelf storing a to-be-sorted item and add the shelf to a candidate shelf set; a first choosing unit, configured to choose a candidate shelf from the candidate shelf set and add the candidate shelf to a target shelf set, the target shelf set storing the to-be-sorted items matching the to-be-sorted order data; and a first outputting unit, configured to output identifiers of target shelves in the target shelf set.

In some embodiments, the first choosing unit includes: a determination subunit, configured to determine, based on the identifiers of the to-be-sorted items and the numbers of the to-be-sorted items included in the to-be-sorted order data, to-be-sorted items and numbers of the to-be-sorted items stored in each candidate shelf in the candidate shelf set, a warehouse-out cost of each candidate shelf in the candidate shelf set; and a choosing subunit, configured to choose, based on the warehouse-out cost of each candidate shelf in the candidate shelf set and a partition to which the each candidate shelf belongs, the candidate shelf and add the candidate shelf to the target shelf set.

In some embodiments, the choosing subunit includes: a choosing module, configured to choose a candidate shelf having a lowest warehouse-out cost and add the candidate shelf to the target shelf set; a determination module, configured to perform following determination step: determining whether the target shelf set stores the to-be-sorted items matching the to-be-sorted order data, and in response to determining that the target shelf set stores the to-be-sorted items matching the to-be-sorted order data, then the adding to the target shelf set is completed.

In some embodiments, the choosing subunit further includes: an updating module, configured to update, in response to determining that the target shelf set does not store the to-be-sorted items matching the to-be-sorted order data, based on a to-be-sorted item and a number of the to-be-sorted item stored in the target shelf set, the identifiers of the to-be-sorted items and the numbers of the to-be-sorted items included in the to-be-sorted order data, determine, based on the updated identifiers of the to-be-sorted items and the numbers of the to-be-sorted items included in the to-be-sorted order data, the to-be-sorted items and the number of the to-be-sorted items stored in each candidate shelf in the candidate shelf set, the warehouse-out cost of each candidate shelf in the candidate shelf set, choose, based on the warehouse-out cost of each candidate shelf in the candidate shelf set and the partition to which the each candidate shelf belongs, the candidate shelf and add the candidate shelf to the target shelf set, and continue to perform the determination step.

In some embodiments, the first outputting unit is further configured to: send the identifiers of the target shelves in the target shelf set to at least one automated guided vehicle, so that the at least one automated guided vehicle moves the target shelves in the target shelf set to a manual sorting area, for a worker in the manual sorting area to sort out the to-be-sorted items matching the to-be-sorted order data from the target shelves in the target shelf set.

In some embodiments, the apparatus further includes: a second acquisition unit, configured to acquire an order data set within a preset time period, wherein a piece of order data comprises order time, an order category, identifiers of items, and numbers of items; a second choosing unit, configured to choose at least one piece of order data from the order data set based on the order time, the order category, and the identifiers of items included in the order data in the order data set; and a generation unit, configured to combine identifiers of items and numbers of the items included in the pieces of order data in the at least one piece of order data, to generate the to-be-sorted order data.

In some embodiments, the apparatus further includes: a second outputting unit, configured to output, in response to determining that the shelf set does not store the to-be-sorted items matching the to-be-sorted order data, replenishment prompt information, wherein the replenishment prompt information comprises the identifier of the to-be-sorted item with insufficient storage in the shelf set.

The method and apparatus for outputting information provided by the embodiments of the present disclosure, by first determining whether to-be-sorted items matching the acquired to-be-sorted order data is stored in a shelf set; in the case it is determined that the to-be-sorted items matching the to-be-sorted order data are stored in the shelf set, determining a shelf storing a to-be-sorted item from the shelf set and adding the same to a candidate shelf set; then choosing a target shelf set storing the to-be-sorted item matching the to-be-sorted order data from the candidate shelf set; and finally outputting identifiers of target shelves in the target shelf set. Therefore, identifiers of target shelves in a target shelf set storing to-be-sorted items matching to-be-sorted order data can be quickly output, which is helpful to improve the efficient of order sorting.

BRIEF DESCRIPTION OF THE DRAWINGS

By reading the detailed description of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should also be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
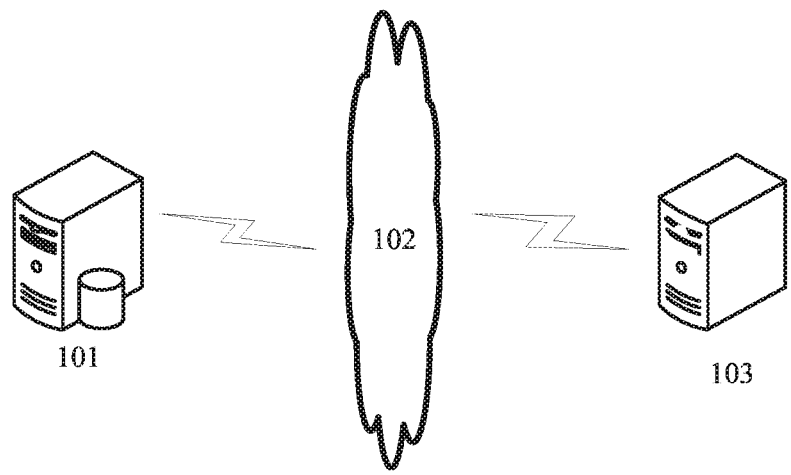
FIG. 1 is a diagram of an exemplary system architecture in which an embodiment of the present disclosure may be implemented.

FIG. 1 illustrates an exemplary system architecture 100 in which a method for outputting information or an apparatus for outputting information of the present disclosure may be implemented.

As shown in FIG. 1, the system architecture 100 may include a database server 101, a network 102, and a server 103. The network 102 is used to provide a communication link medium between the database server 101 and the server 103. The network 102 may include various types of connections, such as wired, wireless communication links, or optic fibers.

The database server 101 may interact with the server 103 through the network 102, to receive or send messages and the like. The database server 101 may be a background database server of a preset website (such as a certain e-commerce website), and is configured to store order data on the preset website.

The server 103 may provide various services. For example, the server 103 may perform analysis and other processing on data such as to-be-sorted order data obtained from the database server 101, and output a processing result (such as an identifier of a target shelf in a target shelf set).

It should be noted that the method for outputting information provided by the embodiments of the present disclosure is generally performed by the server 103. Accordingly, the apparatus for outputting information is generally provided in the server 103.

It should be understood that the number of database servers, networks, and servers in FIG. 1 is merely illustrative. Depending on the implementation needs, there may be any number of database servers, networks, and servers. In the case where the to-be-sorted order data is stored in the server 103, the system architecture 100 may not be provided with the database server 101.

Figure 2:
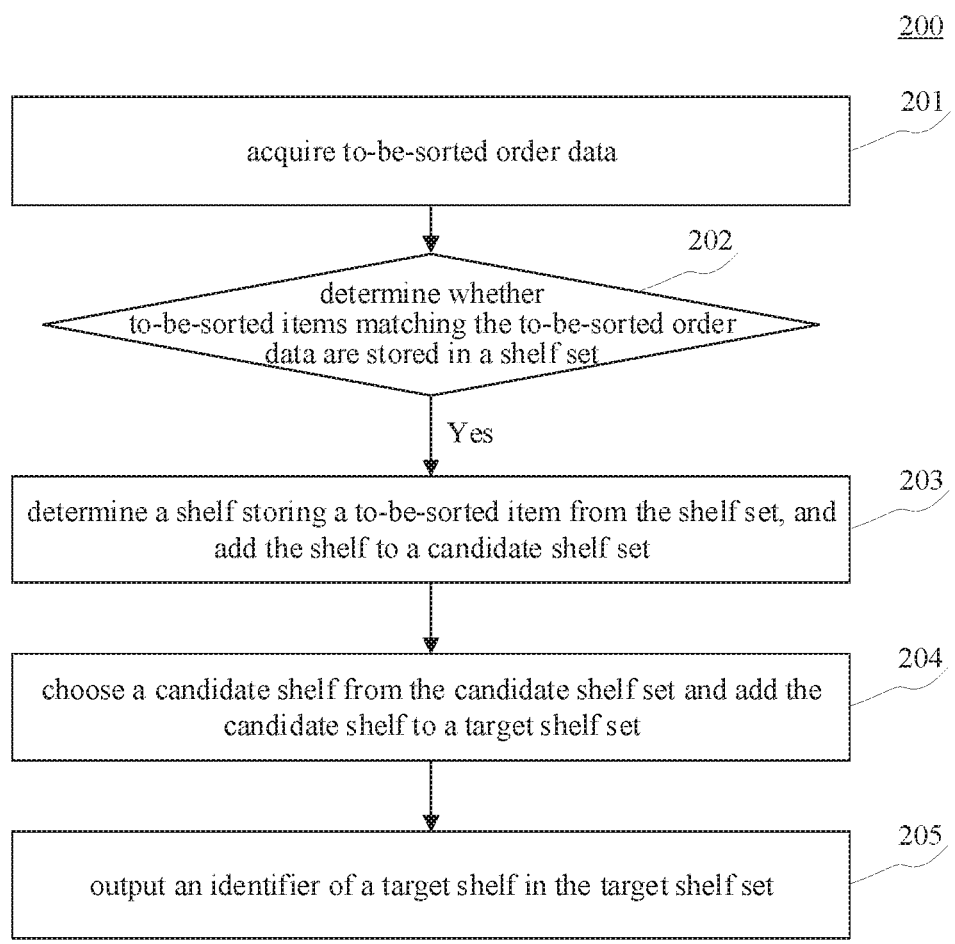
FIG. 2 is a flowchart of a method for outputting information according to an embodiment of the present disclosure.

With further reference to FIG. 2, a flow 200 of a method for outputting information according to an embodiment of the present disclosure is illustrated. The method for outputting information includes the following steps:

Step 201, acquiring to-be-sorted order data.

In the present embodiment, an electronic device (such as the server 103 shown in FIG. 1) on which the method for outputting information operates may acquire the to-be-sorted order data from a database server (such as the database server 101 shown in FIG. 1) or locally. The to-be-sorted order data may include identifiers of to-be-sorted items and the numbers of the to-be-sorted items. A to-be-sorted item may be an item purchased by a user. The identifier of the to-be-sorted item may consist of a letter, a number, a symbol, etc., and may be used to uniquely identify the to-be-sorted item, that is, one identifier of a to-be-sorted item corresponds to one to-be-sorted item. For example, the identifier of the to-be-sorted item may be the SKU (Stock Keeping Unit) number of the to-be-sorted item. The numbers of the to-be-sorted items may be the numbers of various to-be-sorted items corresponding to the to-be-sorted order data.

In some alternative implementations of the present embodiment, the to-be-sorted order data may be order data of an item purchased on a preset website (such as an e-commerce website) by a registered user of the preset website. The to-be-sorted item may be an item ordered by the registered user on the preset website.

In some alternative implementations of the present embodiment, the to-be-sorted order data may also be data obtained by combining a plurality of order data. Specifically, the electronic device may first acquire an order data set within a preset time period (for example, the first three days), a piece of order data including order time, an order category, an identifier of an item, and the number of the item; choose at least one order data from the order data set based on the order time, the order category, and the identifier of the item included in the order data in the order data set; and combine identifiers of items and the numbers of the items included in order data in the at least one order data to generate the to-be-sorted order data. Here, different types of orders correspond to different priorities. The electronic device may try to choose a plurality of order data with earlier order times, higher order priorities, and sharing same item identifiers, and then summarize the identifiers of items and the number of the items in the plurality of order data, that is, generate the to-be-sorted order data.

Step 202, determining whether to-be-sorted items matching the to-be-sorted order data are stored in a shelf set.

In the present embodiment, based on the to-be-sorted order data acquired in step 201, the electronic device may determine whether to-be-sorted items matching the to-be-sorted order data are stored in the shelf set; when it is determined that the to-be-sorted items matching the to-be-sorted order data are stored in the shelf set, step 203 is performed; and when it is determined that to-be-sorted items matching the to-be-sorted order data are not stored in the shelf set, the process is ended or other step is performed. For example, when it is determined that to-be-sorted items matching the to-be-sorted order data are not stored in the shelf set, the electronic device may output replenishment prompt information, where the replenishment prompt information may include the identifier of the to-be-sorted item with insufficient storage in the shelf set. Alternatively, the replenishment prompt information may also include the number of the to-be-sorted item that that need to be replenished.

In the present embodiment, the shelf set may be placed in an shelf area. The shelf set may include a plurality of shelves, one pallet is placed on one shelf, various types of items are placed on one pallet, and a plurality of items of identical types are placed on one pallet. The electronic device may match the identifier of a to-be-sorted item in the to-be-sorted order data with the item identifiers of the items stored on each shelf in the shelf set to determine whether a shelf storing the to-be-sorted item is in the shelf set; if there is the shelf storing the to-be-sorted item, calculate the total number of the to-be-sorted item stored on all the shelves storing the to-be-sorted item; if the total number is not less than the number of the to-be-sorted item in the to-be-sorted order data, then it is determined that the to-be-sorted item matching the to-be-sorted order data is stored in the shelf set; and if there is no shelf storing the to-be-sorted item or the total number is less than the number of the to-be-sorted item in the to-be-sorted order data, it is determined that to-be-sorted item matching the to-be-sorted order data is not stored in the shelf set.

Step 203, determining a shelf storing a to-be-sorted item in the shelf set and adding the shelf to a candidate shelf set.

In the present embodiment, in response to determining that a to-be-sorted item matching the to-be-sorted order data is stored in the shelf set, the electronic device may determine the shelf storing the to-be-sorted item in the shelf set and add the shelf storing the to-be-sorted item as a candidate shelf to the candidate shelf set.

In the present embodiment, the electronic device may match the identifier of a to-be-sorted item in the to-be-sorted order data with the item identifiers of the items stored on each shelf in the shelf set to determine the shelf storing the to-be-sorted item in the shelf set. Specifically, if an item indicated by the identifier of the to-be-sorted item is stored on a shelf, it is determined that the to-be-sorted item is stored on the shelf, and the shelf is used as the candidate shelf.

Step 204, choosing a candidate shelf from the candidate shelf set and adding the same to a target shelf set.

In the present embodiment, based on the candidate shelf set generated in step 203, the electronic device may choose a candidate shelf from the candidate shelf set and add the chose candidate shelf to the target shelf set as a target shelf. The target shelf set stores the to-be-sorted items matching the to-be-sorted order data.

In some alternative implementations of the present embodiment, the electronic device may first randomly choose a candidate shelf from the candidate shelf set and add the same to the target shelf set; then determine whether the number of the to-be-sorted item stored in the target shelf set is not less than the number of the to-be-sorted item in the to-be-sorted order data; if it is not less than the number of the to-be-sorted item, the adding to target shelf set is completed; and if it is less than the number of the to-be-sorted item, then, a candidate shelf is randomly chosen from the candidate shelf set again, and this candidate shelf is added to the target shelf set until the target shelf set stores the to-be-sorted item matching the to-be-sorted order data.

In some alternative implementations of the present embodiment, during the order sorting process, a target shelf in the target shelf set may be moved out of the warehouse by using an AGV (Automated Guided Vehicle). Generally, one AGV moves one target shelf. Specifically, the electronic device may first determine, based on the identifier of the to-be-sorted item and the number of the to-be-sorted item included in the to-be-sorted order data, to-be-sorted items and the number of the to-be-sorted items stored in each candidate shelf in the candidate shelf set, a warehouse-out cost of each candidate shelf in the candidate shelf set; and then choose, based on the warehouse-out cost of each candidate shelf in the candidate shelf set and a partition to which the each candidate shelf belongs, the candidate shelf and add the same to the target shelf set. Generally, the more the types of to-be-sorted items and the greater the number of the to-be-sorted items stored in the candidate shelf, the lower the warehouse-out cost of the candidate shelf. Here, the electronic device may try to choose a candidate shelf with a lower warehouse-out cost as the target shelf and add it to the target shelf set. In this way, the number of the target shelves in the target shelf set is as small as possible, and the number of AGVs for moving the target shelves is also as few as possible, so that order sorting can be completed by using as few AGVs as possible to move as few shelves as possible. The electronic device may also try to choose candidate shelves belonging to an identical partition with lower warehouse-out costs as target shelves and add them to the target shelf set. In this way, the target shelves in the target shelf set belong to an identical partition as many as possible, and the number is as less as possible, and at the same time, the AGV moving distance for moving the target shelf is as short as possible, and the number is as less as possible, so that order sorting can be completed by using as few AGVs as possible to move as few shelves as possible with the moving distance as short as possible. The shelf area may be divided into a plurality of partitions in advance, and each partition includes a plurality of shelves. The distances between the shelves belonging to the same partition are usually chose.

Step 205, outputting an identifier of a target shelf in the target shelf set.

In the present embodiment, based on the target shelf set generated in step 204, the electronic device may output an identifier of a target shelf in the target shelf set. The identifier of the shelf may be composed of a letter, a number, a symbol, etc., and is used to uniquely identify the shelf.

In some alternative implementations of the present embodiment, the electronic device may send the identifier of a target shelf in the target shelf set to the terminal device of a sorting worker. The sorting worker finds the target shelf in the shelf area according to the identifier of the target shelf in the target shelf set displayed on the terminal device, and sorts out the to-be-sorted items matching the to-be-sorted order data on the found target shelf.

In some alternative implementations of the present embodiment, the electronic device may send the identifier of the target shelf in the target shelf set to at least one automated guided vehicle, so that the at least one automated guided vehicle moves the target shelf in the target shelf set to a manual sorting area, for a worker in the manual sorting area to sort out the to-be-sorted item matching the to-be-sorted order data from the target shelf in the target shelf set. Generally, one AGV moves one target shelf, that is, one AGV receives the identifier of one target shelf.

The method for outputting information provided by the embodiments of the present disclosure, by first determining whether a to-be-sorted item matching the acquired to-be-sorted order data is stored in a shelf set; in the case it is determined that a to-be-sorted item matching the to-be-sorted order data is stored in the shelf set, determining a shelf storing the to-be-sorted item from the shelf set and adding the same to a candidate shelf set; then choosing a target shelf set storing the to-be-sorted item matching the to-be-sorted order data from the candidate shelf set; and finally outputting an identifier of a target shelf in the target shelf set. Therefore, an identifier of a target shelf in a target shelf set storing a to-be-sorted item matching to-be-sorted order data can be quickly output, which is helpful to improve the efficient of order sorting.

Figure 3:
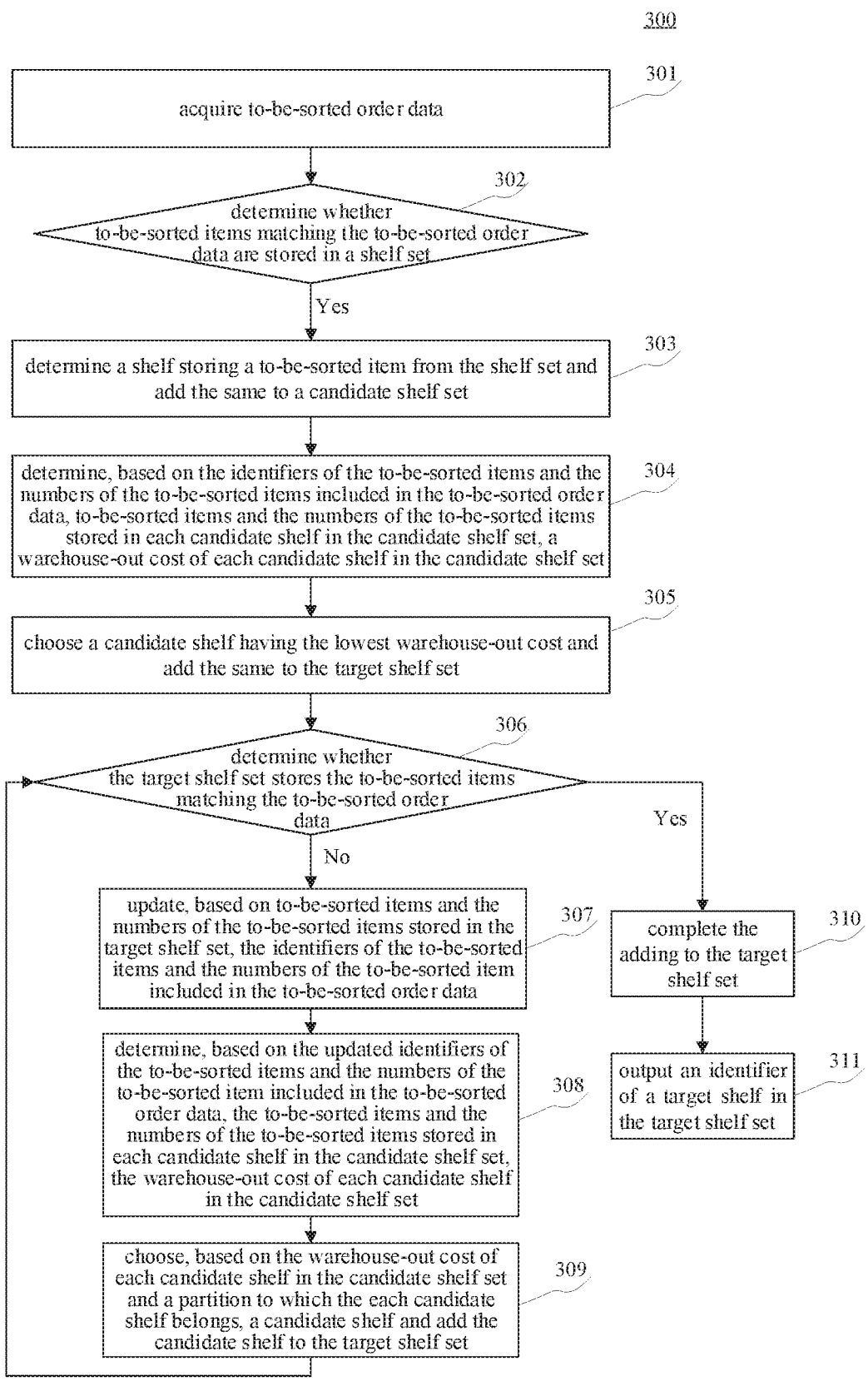
FIG. 3 is a flowchart of a method for outputting information according to another embodiment of the present disclosure.

With further reference to FIG. 3, a flow 300 of another embodiment of the method for outputting information according to the present disclosure is illustrated. The flow 300 of the method for outputting information includes the following steps:

Step 301, acquiring to-be-sorted order data.

In the present embodiment, an electronic device (such as the server 103 shown in FIG. 1) on which the method for outputting information operates may acquire the to-be-sorted order data from a database server (such as the database server 101 shown in FIG. 1) or locally. The to-be-sorted order data may include identifiers of to-be-sorted items and the number of the to-be-sorted item. A to-be-sorted item may be an item purchased by a user. The identifier of a to-be-sorted item may consist of a letter, a number, a symbol, etc., and may be used to uniquely identify the to-be-sorted item, that is, one identifier of a to-be-sorted item corresponds to one to-be-sorted item. For example, the identifier of the to-be-sorted item may be the SKU number of the to-be-sorted item. The numbers of the to-be-sorted items may be the numbers of various to-be-sorted items corresponding to the to-be-sorted order data.

Step 302, determining whether to-be-sorted items matching the to-be-sorted order data are stored in a shelf set.

In the present embodiment, based on the to-be-sorted order data acquired in step 301, the electronic device may determine whether to-be-sorted items matching the to-be-sorted order data are stored in the shelf set; when it is determined that the to-be-sorted items matching the to-be-sorted order data are stored in the shelf set, step 303 is performed; and when it is determined that to-be-sorted items matching the to-be-sorted order data are not stored in the shelf set, the process is ended or other step is performed.

Step 303, determining a shelf storing a to-be-sorted item in the shelf set and adding the same to a candidate shelf set.

In the present embodiment, in response to determining that a to-be-sorted item matching the to-be-sorted order data is stored in the shelf set, the electronic device may determine the shelf storing the to-be-sorted item in the shelf set and add the shelf storing the to-be-sorted item as a candidate shelf to the candidate shelf set.

Step 304, determining, based on the identifiers of the to-be-sorted items and the numbers of the to-be-sorted items included in the to-be-sorted order data, to-be-sorted items and the numbers of the to-be-sorted items stored in each candidate shelf in the candidate shelf set, a warehouse-out cost of each candidate shelf in the candidate shelf set.

In the present embodiment, the electronic device may determine, based on the identifiers of the to-be-sorted items and the numbers of the to-be-sorted items included in the to-be-sorted order data, the to-be-sorted items and the numbers of the to-be-sorted items stored in each candidate shelf in the candidate shelf set, the warehouse-out cost of each candidate shelf in the candidate shelf set. In practice, during the order sorting process, a shelf may be moved out of the warehouse by using an AGV. Generally, one AGV moves one shelf. The more types of to-be-sorted items and the greater the number of a to-be-sorted item stored in the candidate shelf, the lower the warehouse-out cost of the candidate shelf.

In some alternative implementations of the present embodiment, the electronic device may calculate the warehouse-out cost $c_i$ of the $i^{th}$ candidate shelf in the candidate shelf set by the following formula:

$$c_i = \sum_{s \in s_0} \max(r_s - q_s, 0) + a_1 \times T_i + a_2 \times K_i;$$

Here, the candidate shelf set includes N (N is a positive integer) candidate shelves, $1 \leq i \leq N$ (i is a positive integer), c is the warehouse-out cost of the candidate shelf, $c_i$ is the warehouse-out cost of the $i^{th}$ candidate shelf, and $s_o$ is the number of types of the to-be-sorted item corresponding to the to-be-sorted order data, $1 \leq s \leq s_0$ (s is a positive integer), r is the number of the to-be-sorted item corresponding to the to-be-sorted order data, $r_s$ is the number of the $s^{th}$-type to-be-sorted item corresponding to the to-be-sorted order data, q is the number of the to-be-sorted item stored on the $i^{th}$ candidate shelf, $q_s$ is the number of the $s^{th}$-type to-be-sorted item stored on the $i^{th}$ candidate shelf, and $a_1$ and $a_2$ are balance parameters whose values may be determined through simulation debugging. When the $i^{th}$ candidate shelf stores a to-be-sorted item corresponding to other to-be-sorted order data with the same order cut-off time to the to-be-sorted order data, $T_i=0$, when the $i^{th}$ candidate shelf does not store a to-be-sorted item corresponding to other to-be-sorted order data, $T_i=1$, and when the $i^{th}$ candidate shelf stores a to-be-sorted item corresponding to other to-be-sorted order data with a different order cut-off time to the to-be-sorted order data, $T_i=2$, $K_i$ is:

$$K_i = \begin{cases} 0, D = 0 \\ \dfrac{1}{D} \times \sum_{j=1}^{D} b_{ij}, D > 0 \end{cases};$$

Here, the target shelf set includes D (D is a positive integer) target shelves, $1 \leq j \leq D$ (j is a positive integer), and $b_{ij}$ is a difference between the serial numbers of the partitions to which the i candidate shelf and the j target shelf respectively belongs.

Step 305, choosing a candidate shelf having the lowest warehouse-out cost and adding the same to the target shelf set.

In the present embodiment, based on the warehouse-out cost of each candidate shelf in the candidate shelf set determined in step 304, the electronic device may choose the candidate shelf having the lowest warehouse-out cost as a target shelf, and add the target shelf to the target shelf set. Here, the electronic device may first choose the candidate shelf having the lowest warehouse-out cost as the target shelf and add it to the target shelf set, and in this way, the number of target shelves in the target shelf set is as less as possible, and at the same time, the number of AGVs moving the target shelves is also as few as possible, so that order sorting can be completed by using as few AGVs as possible to move as few shelves as possible.

Step 306, determining whether the target shelf set stores the to-be-sorted items matching the to-be-sorted order data.

In the present embodiment, based on the target shelf set generated in step 305 or step 309, the electronic device may determine whether the target shelf set stores the to-be-sorted items matching the to-be-sorted order data; when it is determined that the target shelf set stores the to-be-sorted items matching the to-be-sorted order data, step 310 is performed; and when it is determined that the target shelf set does not store the to-be-sorted items matching the to-be-sorted order data, step 307 is performed. Specifically, the electronic device may calculate the total number of a to-be-sorted item stored on all the target shelves in the target shelf set; if the total number is not less than the number of the to-be-sorted item in the to-be-sorted order data, step 310 is performed; and if the total number is less than the number of the to-be-sorted item in the to-be-sorted order data, step 307 is performed.

Step 307, updating, based on to-be-sorted items and the numbers of the to-be-sorted items stored in the target shelf set, the identifiers of the to-be-sorted items and the numbers of the to-be-sorted items included in the to-be-sorted order data.

In the present embodiment, when it is determined that the target shelf set does not store the to-be-sorted items matching the to-be-sorted order data, the electronic device may update the identifiers of the to-be-sorted items and the numbers of the to-be-sorted items included in the to-be-sorted order data, based on the to-be-sorted items and the numbers of the to-be-sorted items stored in the target shelf set. Specifically, the electronic device may subtract the number of a to-be-sorted item included in the to-be-sorted order data from the total number of the to-be-sorted item stored on all the target shelves in the target shelf set, and use the obtained difference to update the number of the to-be-sorted item included in the to-be-sorted order data. In the case where the to-be-sorted order data includes a plurality of identifiers of to-be-sorted items, if the number of a to-be-sorted item corresponding to an identifier of the to-be-sorted item does not exceed zero, it means that a sufficient amount of the to-be-sorted item corresponding to the identifier of the to-be-sorted item has been stored in the target shelf set, in this regard, the identifier of the to-be-sorted item is deleted from the to-be-sorted order data.

Step 308, determining, based on the updated identifiers of the to-be-sorted items and the numbers of the to-be-sorted items included in the to-be-sorted order data, the to-be-sorted items and the numbers of the to-be-sorted items stored in each candidate shelf in the candidate shelf set, the warehouse-out cost of each candidate shelf in the candidate shelf set.

In the present embodiment, based on the updated identifiers of the to-be-sorted item and the numbers of the to-be-sorted items included in the to-be-sorted order data, the to-be-sorted items and the numbers of the to-be-sorted items stored in each candidate shelf in the candidate shelf set obtained in step 307, the electronic device may determine the warehouse-out cost of each candidate shelf in the candidate shelf set. Here, the electronic device may determine the warehouse-out cost of each candidate shelf in the candidate shelf set by using the same method as in step 304, and detailed description thereof will be omitted.

Step 309, choosing, based on the warehouse-out cost of each candidate shelf in the candidate shelf set and a partition to which the candidate shelf belongs, the candidate shelf and adding the same to the target shelf set.

In the present embodiment, based on the warehouse-out cost of each candidate shelf in the candidate shelf set determined in step 308 and the partition to which each candidate shelf belongs, the electronic device may choose a candidate shelf as the target shelf, add it to the target shelf set, and return to continue to perform step 306, until the target shelf set stores the to-be-sorted items matching the to-be-sorted order data. Here, the electronic device may try to choose candidate shelves belonging to an identical partition with lower warehouse-out costs as target shelves and add them to the target shelf set. In this way, the target shelves in the target shelf set belong to an identical partition as many as possible, and the number is as less as possible. At the same time, the AGV moving distance for moving the target shelf should be as short as possible, and the number of AGV is as less as possible, so that order sorting can be completed by using as few AGVs as possible to move as few shelves as possible with the moving distance as short as possible. The shelf area may be divided into a plurality of partitions in advance, and each partition includes a plurality of shelves. The distances between the shelves belonging to an identical partition are usually close.

Step 310, completing the adding to the target shelf set.

In the present embodiment, when it is determined that the target shelf set stores the to-be-sorted items matching the to-be-sorted order data, the adding to the target shelf set is completed. In this regard, the operation of choosing a candidate shelf from the candidate shelf set is terminated.

Step 311, outputting identifiers of target shelves in the target shelf set.

In the present embodiment, based on the target shelf set generated in step 310, the electronic device may output the identifiers of the target shelves in the target shelf set. The identifier of a shelf may consist of a letter, a number, a symbol, etc., and is used to uniquely identify the shelf.

As can be seen from FIG. 3, compared with the embodiment corresponding to FIG. 2, the flow 300 of the method for outputting information in the present embodiment highlights the step of choosing a candidate shelf from the candidate shelf set to generate a target shelf set. Therefore, in the solution described in the present embodiment, the target shelves in the target shelf set belong to an identical partition as many as possible, and the number of target shelf is as less as possible. At the same time, the AGV moving distance for moving the target shelf is as short as possible, and the number of AGV is as less as possible, so that order sorting can be completed by using as few AGVs as possible to move as few shelves as possible with the moving distance as short as possible.

Figure 4:
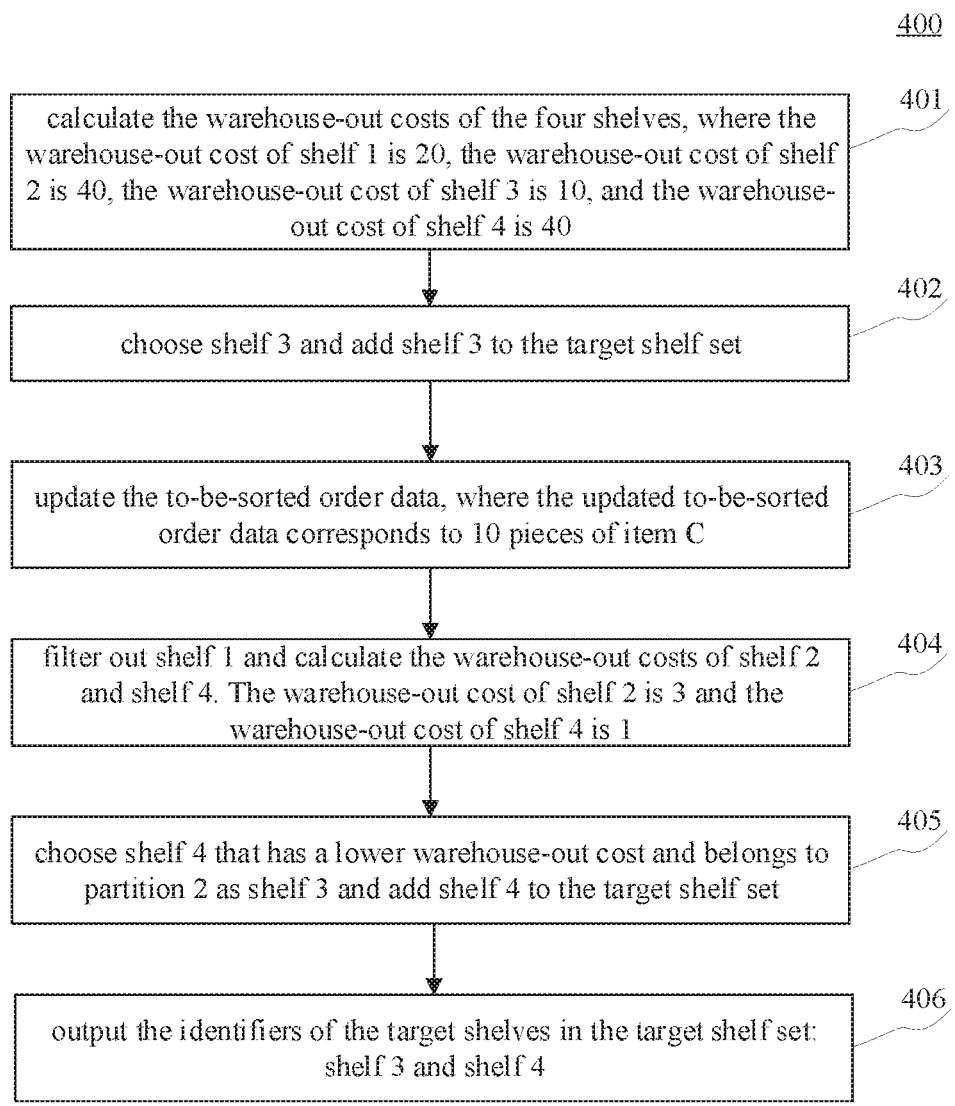
FIG. 4 is a flowchart of the method for outputting information according to an application scenario of the present disclosure.

With further reference to FIG. 4, FIG. 4 is a flowchart of an application scenario of the method for outputting information according to the present disclosure. In the application scenario of FIG. 4, the shelf area may include two partitions, namely partition 1 and partition 2; partition 1 may include two shelves, namely shelf 1 and shelf 2, and partition 2 may include two shelves, namely shelf 3 and Shelf 4; shelf 1 stores 10 pieces of item A and 20 pieces of item B, and shelf 1 also stores other to-be-sorted items corresponding to other to-be-sorted order data having the same order cut-off time as the to-be-sorted order data, shelf 2 stores 20 pieces of item C and 70 pieces of item D, shelf 3 stores 100 pieces of item A and 50 pieces of item B, and shelf 3 also stores other to-be-sorted items corresponding to other to-be-sorted order data having a different order cut-off time to the to-be-sorted order data, shelf 4 stores 20 pieces of item C and 70 pieces of item D; and the to-be-sorted order data corresponds to 20 pieces of item A, 20 pieces of item B, and 10 pieces of item C. In the flow 400 of the application scenario in FIG. 4, as shown in step 401, the electronic device may calculate the warehouse-out costs of the four shelves, where the warehouse-out cost of shelf 1 is 20, the warehouse-out cost of shelf 2 is 40, the warehouse-out cost of shelf 3 is 10, and the warehouse-out cost of shelf 4 is 40; as shown in step 402, the electronic device may choose shelf 3 and add it to the target shelf set; as shown in step 403, the electronic device may update the to-be-sorted order data, where the updated to-be-sorted order data corresponds to 10 pieces of item C; because item C is not stored on shelf 1, as shown in step 404, the electronic device may filter out shelf 1 and calculate the warehouse-out costs of shelf 2 and shelf 4. The warehouse-out cost of shelf 2 is 3 and the warehouse-out cost of shelf 4 is 1; as shown in step 405, the electronic device may choose shelf 4 which has a lower warehouse-out cost and belongs to partition 2 as shelf 3, and add shelf 4 to the target shelf set; and as shown in step 406, the electronic device may output the identifiers of the target shelves in the target shelf set: shelf 3 and shelf 4.

Figure 5:
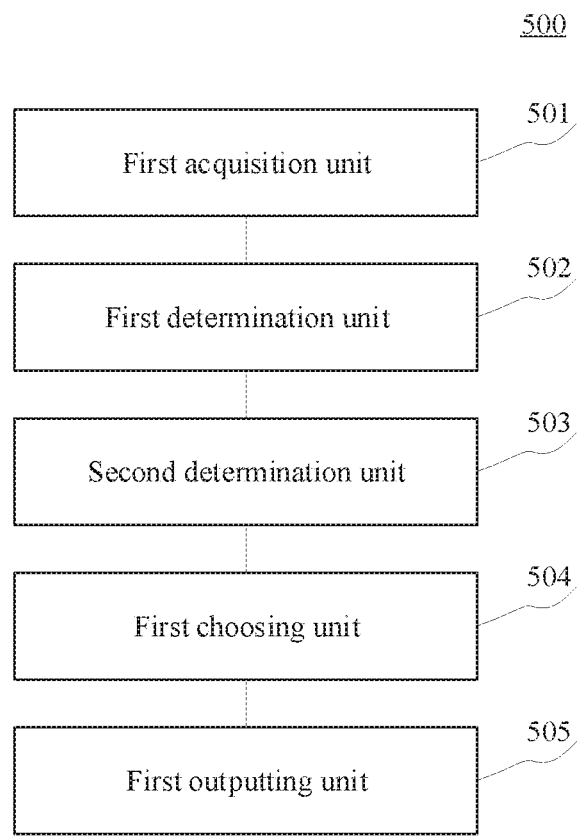
FIG. 5 is a schematic structural diagram of an apparatus for outputting information according to an embodiment of the present disclosure.

With further reference to FIG. 5, as an implementation of the method shown in the above figures, the present disclosure provides an embodiment of an apparatus for outputting information, and the apparatus embodiment corresponds to the method embodiment as shown in FIG. 2. The apparatus may be specifically applied to various electronic devices.

As shown in FIG. 5, an apparatus 500 for outputting information of the present embodiment may include: a first acquisition unit 501, a first determination unit 502, a second determination unit 503, a first choosing unit 504, and a first outputting unit 505. The first acquisition unit 501 is configured to acquire to-be-sorted order data, the to-be-sorted order data including identifiers of to-be-sorted items and the numbers of the to-be-sorted items. The first determination unit 502 is configured to determine whether a shelf set stores to-be-sorted items matching the to-be-sorted order data. The second determination unit 503 is configured to determine, in response to determining that the shelf set stores the to-be-sorted items matching the to-be-sorted order data, from the shelf set, a shelf storing a to-be-sorted item and add the same to a candidate shelf set. The first choosing unit 504 is configured to choose a candidate shelf from the candidate shelf set and add the same to a target shelf set, the target shelf set storing the to-be-sorted item matching the to-be-sorted order data. The first outputting unit 505 is configured to output identifiers of target shelves in the target shelf set.

In the present embodiment, in the apparatus 500 for outputting information: the specific processing and the technical effects thereof of the first acquisition unit 501, the first determination unit 502, the second determination unit 503, the first choosing unit 504, and the first outputting unit 505 may be referred to the relevant descriptions of step 201, step 202, step 203, step 204 and step 205 in the corresponding embodiment of FIG. 2, respectively, and detailed description thereof will be omitted.

In some alternative implementations of the present embodiment, the first choosing unit 504 may include: a determination subunit (not shown in the figure), configured to determine, based on the identifiers of the to-be-sorted items and the numbers of the to-be-sorted items included in the to-be-sorted order data, to-be-sorted items and the numbers of the to-be-sorted items stored in each candidate shelf in the candidate shelf set, a warehouse-out cost of each candidate shelf in the candidate shelf set; and a choosing subunit (not shown in the figure), configured to choose, based on the warehouse-out cost of each candidate shelf in the candidate shelf set and a partition to which the each candidate shelf belongs, the candidate shelf and add the candidate shelf to the target shelf set.

In some alternative implementations of the present embodiment, the choosing subunit may include: a choosing module (not shown in the figure), configured to choose a candidate shelf having the lowest warehouse-out cost and add the candidate shelf to the target shelf set; a determination module (not shown in the figure), configured to perform the following determination step: determining whether the target shelf set stores the to-be-sorted item matching the to-be-sorted order data, and in response to determining that the target shelf set stores the to-be-sorted item matching the to-be-sorted order data, then the adding to the target shelf set is completed.

In some alternative implementations of the present embodiment, the choosing subunit may further include: an updating module (not shown in the figure), configured to update, in response to determining that the target shelf set does not store the to-be-sorted items matching the to-be-sorted order data, based on a to-be-sorted item and the number of the to-be-sorted item stored in the target shelf set, the identifiers of the to-be-sorted items and the numbers of the to-be-sorted items included in the to-be-sorted order data, determine, based on the updated identifiers of the to-be-sorted items and the numbers of the to-be-sorted items included in the to-be-sorted order data, the to-be-sorted items and the number of the to-be-sorted items stored in each candidate shelf in the candidate shelf set, the warehouse-out cost of each candidate shelf in the candidate shelf set, choose, based on the warehouse-out cost of each candidate shelf in the candidate shelf set and the partition to which the each candidate shelf belongs, the candidate shelf and add the same to the target shelf set, and continue to perform the determination step.

In some alternative implementations of the present embodiment, the first outputting unit 505 may be further configured to: send the identifiers of the target shelves in the target shelf set to at least one automated guided vehicle, so that the at least one automated guided vehicle moves the target shelves in the target shelf set to a manual sorting area, for a worker in the manual sorting area to sort out the to-be-sorted items matching the to-be-sorted order data from the target shelves in the target shelf set.

In some alternative implementations of the present embodiment, the apparatus 500 for outputting information may further include: a second acquisition unit (not shown in the figure), configured to acquire an order data set within a preset time period, where a piece of order data includes order time, an order category, identifiers of items, and the numbers of the items; a second choosing unit (not shown in the figure), configured to choose at least one piece of order data from the order data set based on the order time, the order category, and the identifiers of items included in the order data in the order data set; and a generation unit (not shown in the figure), configured to combine identifiers of items and the numbers of the items included in order data in the pieces of the at least one piece of order data, to generate the to-be-sorted order data.

In some alternative implementations of the present embodiment, the apparatus 500 for outputting information may further include: a second outputting unit (not shown in the figure), configured to output, in response to determining that the shelf set does not store the to-be-sorted items matching the to-be-sorted order data, replenishment prompt information, where the replenishment prompt information includes the identifier of the to-be-sorted item with insufficient storage in the shelf set.

Figure 6:
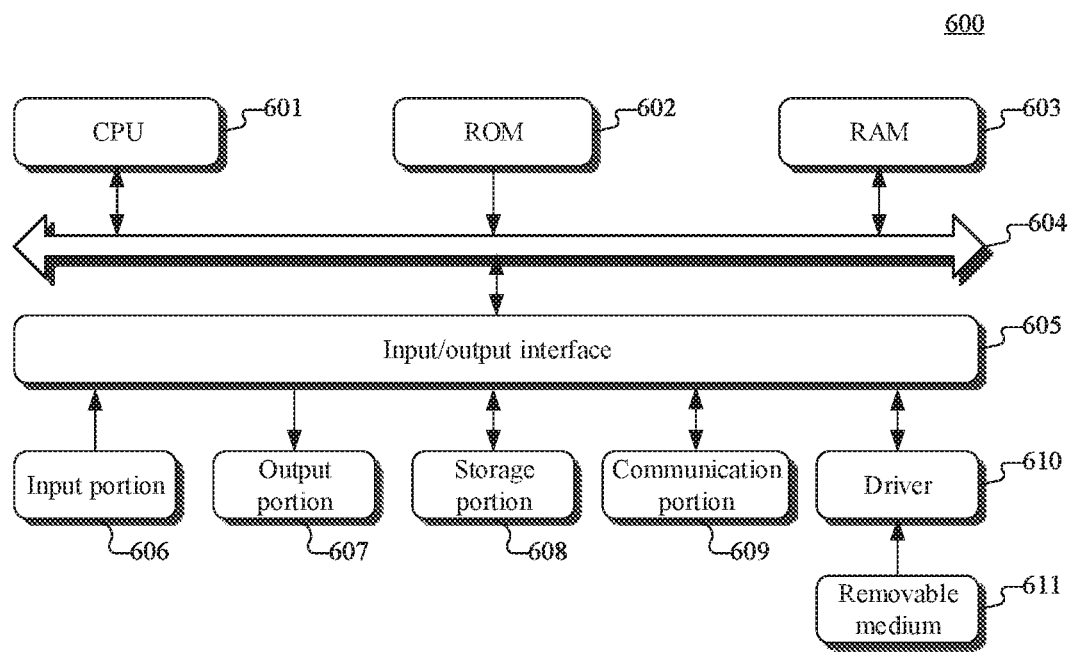
FIG. 6 is a schematic structural diagram of a computer system adapted to implement an electronic device according to an embodiment of the present disclosure.

With further reference to FIG. 6, a schematic structural diagram of a computer system 600 adapted to implement the electronic device of the embodiments of the present disclosure is illustrated. The electronic device shown in FIG. 6 is merely an example and should not impose any limitation on the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 609, or may be installed from the removable medium 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions The units involved in the embodiments of the present disclosure may be implemented by means of software or hardware. The described units may also be provided in a processor, for example, may be described as: a processor including a first acquisition unit, a first determination unit, a second determination unit, a first choosing unit, and a first outputting unit. Here, the names of these units do not in some cases constitute limitations to such units themselves. For example, the first acquisition unit may also be described as "a unit configured to acquire to-be-sorted order data".

In another aspect, the present disclosure further provides a computer readable medium. The computer readable medium may be included in the electronic device in the above described embodiments, or a stand-alone computer readable medium not assembled into the electronic device. The computer readable medium carries one or more programs. The one or more programs, when executed by the electronic device, cause the electronic device to: acquire to-be-sorted order data, the to-be-sorted order data including identifiers of to-be-sorted items and the numbers of the to-be-sorted items; determine whether a shelf set stores to-be-sorted items matching the to-be-sorted order data; in response to determining that the shelf stores the to-be-sorted items matching the to-be-sorted order data, determine from the shelf set a shelf storing a to-be-sorted item, and add the same to a candidate shelf set; choose a candidate shelf from the candidate shelf set and add the same to a target shelf set, the target shelf set storing the to-be-sorted items matching the to-be-sorted order data; and output identifiers of target shelves in the target shelf set.

What is claimed is:

1. A method for outputting information, comprising:
    acquiring, by a processor, to-be-sorted order data, the to-be-sorted order data comprising identifiers of to-be-sorted items and numbers of the to-be-sorted items;
    determining, by the processor, whether a shelf set stores to-be-sorted items matching the to-be-sorted order data;
    in response to determining that the shelf set stores the to-be-sorted items matching the to-be-sorted order data, determining by the processor, from the shelf set, a shelf storing a to-be-sorted item, and adding the shelf to a candidate shelf set;
    choosing, by the processor, a candidate shelf from the candidate shelf set and adding the candidate shelf to a target shelf set, the target shelf set storing the to-be-sorted items matching the to-be-sorted order data;
    outputting, by the processor, identifiers of target shelves in the target shelf set, comprising sending the identifiers of the target shelves in the target shelf set to at least one automated guided vehicle (AGV); and moving, by the at least one AGV, the target shelves in the target shelf set to a manual sorting area, for sorting out, at the manual sorting area, the to-be-sorted items matching the to-be-sorted order data from the target shelves in the target shelf set.

2. The method according to claim 1, wherein the choosing a candidate shelf from the candidate shelf set and adding the candidate shelf to a target shelf set comprises:

determining, based on the identifiers of the to-be-sorted items and the numbers of the to-be-sorted items included in the to-be-sorted order data, to-be-sorted items and numbers of the to-be-sorted items stored in each candidate shelf in the candidate shelf set, a warehouse-out cost of each candidate shelf in the candidate shelf set; and choosing, based on the warehouse-out cost of each candidate shelf in the candidate shelf set and a partition to which the each candidate shelf belongs, the candidate shelf and adding the candidate shelf to the target shelf set.

3. The method according to claim 2, wherein the choosing, based on the warehouse-out cost of each candidate shelf in the candidate shelf set and partition to which the each candidate shelf, the candidate shelf and adding the candidate shelf to the target shelf set comprises:

choosing a candidate shelf having a lowest warehouse-out cost and adding the candidate shelf to the target shelf set;

performing following determination step: determining whether the target shelf set stores the to-be-sorted items matching the to-be-sorted order data, and in response to determining that the target shelf set stores the to-be-sorted items matching the to-be-sorted order data, then the adding to the target shelf set is completed.

4. The method according to claim 3, wherein the choosing, based on the warehouse-out cost of each candidate shelf in the candidate shelf set and a partition to which the each candidate shelf, the candidate shelf and adding the candidate shelf to the target shelf set further comprises:

in response to determining that the target shelf set does not store the to-be-sorted items matching the to-be-sorted order data:

updating, based on a to-be-sorted item and a number of the to-be-sorted item stored in the target shelf set, the identifiers of the to-be-sorted items and the numbers of the to-be-sorted items included in the to-be-sorted order data;

determining, based on the updated identifiers of the to-be-sorted items and the numbers of the to-be-sorted items included in the to-be-sorted order data, the to-be-sorted items and the number of the to-be-sorted items stored in each candidate shelf in the candidate shelf set, the warehouse-out cost of each candidate shelf in the candidate shelf set; and choosing, based on the warehouse-out cost of each candidate shelf in the candidate shelf set and the partition to which the each candidate shelf belongs, the candidate shelf, adding the candidate shelf to the target shelf set, and continuing to perform the determination step.

5. The method according to claim 1, wherein before the acquiring to-be-sorted order data, the method further comprises:

acquiring an order data set within a preset time period, wherein a piece of order data comprises order time, an order category, identifiers of items, and numbers of the items;

choosing at least one piece of order data from the order data set based on the order time, the order category, and the identifiers of items included in the order data in the order data set; and combining identifiers of items and numbers of the items included in the pieces of order data in the at least one piece of order data, to generate the to-be-sorted order data.

6. The method according to claim 1, wherein the method further comprises:

in response to determining that the shelf set does not store the be-sorted items matching the to-be-sorted order data, outputting replenishment prompt information, wherein the replenishment prompt information comprises the identifier of the to-be-sorted item with insufficient storage in the shelf set.

7. An apparatus for outputting information, comprising:
at least one processor; and
a memory storing instructions, the instructions when executed by the at least one processor, cause the at least one processor to perform operations, the operations comprising:

acquiring to-be-sorted order data, the to-be-sorted order data comprising identifiers of to-be-sorted items and numbers of the to-be-sorted items;

determining whether a shelf set stores to-be-sorted items matching the to-be-sorted order data;

determining, in response to determining that the shelf set stores the to-be-sorted items matching the to-be-sorted order data, from the shelf set, a shelf storing a to-be-sorted item and adding the shelf to a candidate shelf set;

choosing a candidate shelf from the candidate shelf set and adding the candidate shelf to a target shelf set, the target shelf set storing the to-be-sorted items matching the to-be-sorted order data; and outputting identifiers of target shelves in the target shelf set, comprising sending the identifiers of the target shelves in the target shelf set to at least one automated guided vehicle (AGV); and moving, by the at least one AGV, the target shelves in the target shelf set to a manual sorting area, for sorting out, at the manual sorting area, the to-be-sorted items matching the to-be-sorted order data from the target shelves in the target shelf set.

8. The apparatus according to claim 7, wherein the choosing a candidate shelf from the candidate shelf set and adding the candidate shelf to a target shelf set comprises:

determining, based on the identifiers of the to-be-sorted items and the numbers of the to-be-sorted items included in the to-be-sorted order data, to-be-sorted items and numbers of the to-be-sorted items stored in each candidate shelf in the candidate shelf set, a warehouse-out cost of each candidate shelf in the candidate shelf set; and choosing, based on the warehouse-out cost of each candidate shelf in the candidate shelf set and a partition to which the each candidate shelf belongs, the candidate shelf and adding the candidate shelf to the target shelf set.

9. The apparatus according to claim 8, wherein the choosing, based on the warehouse-out cost of each candidate shelf in the candidate shelf set and partition to which the each candidate shelf, the candidate shelf and adding the candidate shelf to the target shelf set comprises:
choosing a candidate shelf having a lowest warehouse-out cost and adding the candidate shelf to the target shelf set;
performing following determination step: determining whether the target shelf set stores the to-be-sorted items matching the to-be-sorted order data, and in response to determining that the target shelf set stores the to-be-sorted items matching the to-be-sorted order data, then the adding to the target shelf set is completed.

10. The apparatus according to claim 9, wherein choosing, based on the warehouse-out cost of each candidate shelf in the candidate shelf set and a partition to which the each candidate shelf, the candidate shelf and adding the candidate shelf to the target shelf set further comprises:
in response to determining that the target shelf set does not store the to-be-sorted items matching the to-be-sorted order data:
updating, based on a to-be-sorted item and a number of the to-be-sorted item stored in the target shelf set, the identifiers of the to-be-sorted items and the numbers of the to-be-sorted items included in the to-be-sorted order data; and
determining, based on the updated identifiers of the to-be-sorted items and the numbers of the to-be-sorted items included in the to-be-sorted order data, the to-be-sorted items and the number of the to-be-sorted items stored in each candidate shelf in the candidate shelf set, the warehouse-out cost of each candidate shelf in the candidate shelf set;
choosing, based on the warehouse-out cost of each candidate shelf in the candidate shelf set and the partition to which the each candidate shelf belongs, the candidate shelf, adding the candidate shelf to the target shelf set, and continuing to perform the determination step.

11. The apparatus according to claim 7, wherein before the acquiring to-be-sorted order data, the operations further comprise:
acquiring an order data set within a preset time period, wherein a piece of order data comprises order time, an order category, identifiers of items, and numbers of items;
choosing at least one piece of order data from the order data set based on the order time, the order category, and the identifiers of items included in the order data in the order data set; and
combining identifiers of items and numbers of the items included in the pieces of order data in the at least one piece of order data, to generate the to-be-sorted order data.

12. The apparatus according to claim 7, wherein the operations further comprise:
in response to determining that the shelf set does not store the to-be-sorted items matching the to-be-sorted order data, outputting replenishment prompt information, wherein the replenishment prompt information comprises the identifier of the to-be-sorted item with insufficient storage in the shelf set.

13. A non-transitory computer readable storage medium, storing a computer program thereon, the program, when executed by a processor, cause the processor to perform operations, the operations comprising:
acquiring to-be-sorted order data, the to-be-sorted order data comprising identifiers of to-be-sorted items and numbers of the to-be-sorted items;
determining whether a shelf set stores to-be-sorted items matching the to-be-sorted order data;
in response to determining that the shelf set stores the to-be-sorted items matching the to-be-sorted order data, determining, from the shelf set, a shelf storing a to-be-sorted item, and adding the shelf to a candidate shelf set;
choosing a candidate shelf from the candidate shelf set and adding the candidate shelf to a target shelf set, the target shelf set storing the to-be-sorted items matching the to-be-sorted order data; and
outputting identifiers of target shelves in the target shelf set, comprising sending the identifiers of the target shelves in the target shelf set to at least one automated guided vehicle (AGV); and
moving, by the at least one AGV, the target shelves in the target shelf set to a manual sorting area, for sorting out, at the manual sorting area, the to-be-sorted items matching the to-be-sorted order data from the target shelves in the target shelf set.

14. The medium according to claim 13, wherein the choosing a candidate shelf from the candidate shelf set and adding the candidate shelf to a target shelf set comprises: determining, based on the identifiers of the to-be-sorted items and the numbers of the to-be-sorted items included in the to-be-sorted order data, to-be-sorted items and numbers of the to-be-sorted items stored in each candidate shelf in the candidate shelf set, a warehouse-out cost of each candidate shelf in the candidate shelf set; and choosing, based on the warehouse-out cost of each candidate shelf in the candidate shelf set and a partition to which the each candidate shelf belongs, the candidate shelf and adding the candidate shelf to the target shelf set.

15. The medium according to claim 13, wherein the choosing, based on the warehouse-out cost of each candidate shelf in the candidate shelf set and a partition to which the each candidate shelf, the candidate shelf and adding the candidate shelf to the target shelf set comprises:
choosing a candidate shelf having a lowest warehouse-out cost and adding the candidate shelf to the target shelf set;
performing following determination step: determining whether the target shelf set stores the to-be-sorted items matching the to-be-sorted order data, and in response to determining that the target shelf set stores the to-be-sorted items matching the to-be-sorted order data, then the adding to the target shelf set is completed.

16. The medium according to claim 14, wherein the choosing, based on the warehouse-out cost of each candidate shelf in the candidate shelf set and a partition to which the each candidate shelf, the candidate shelf and adding the candidate shelf to the target shelf set further comprises:
in response to determining that the target shelf set does not store the to-be-sorted items matching the to-be-sorted order data:
updating, based on a to-be-sorted item and a number of the to-be-sorted item stored in the target shelf set, the identifiers of the to-be-sorted items and the numbers of the to-be-sorted items included in the to-be-sorted order data;
determining, based on the updated identifiers of the to-be-sorted items and the numbers of the to-be-sorted items included in the to-be-sorted order data, the to-be-sorted items and the number of the to-be-sorted items stored in each candidate shelf in the candidate shelf set, the warehouse-out cost of each candidate shelf in the candidate shelf set;

choosing, based on the warehouse-out cost of each candidate shelf in the candidate shelf set and the partition to which the each candidate shelf belongs, the candidate shelf, adding the candidate shelf to the target shelf set, and continuing to perform the determination step.

* * * * *